Oct. 11, 1949.　　　A. E. KOEPPE　　　2,484,099
AIRCRAFT ROTOR AND CONTROL THEREOF
Filed Oct. 5, 1946　　　3 Sheets-Sheet 1

INVENTOR.
Alvern E. Koeppe
BY
Bean, Brooks, Buckley & Bean
ATTORNEYS

Oct. 11, 1949.  A. E. KOEPPE  2,484,099
AIRCRAFT ROTOR AND CONTROL THEREOF
Filed Oct. 5, 1946  3 Sheets-Sheet 2
Fig. 4.
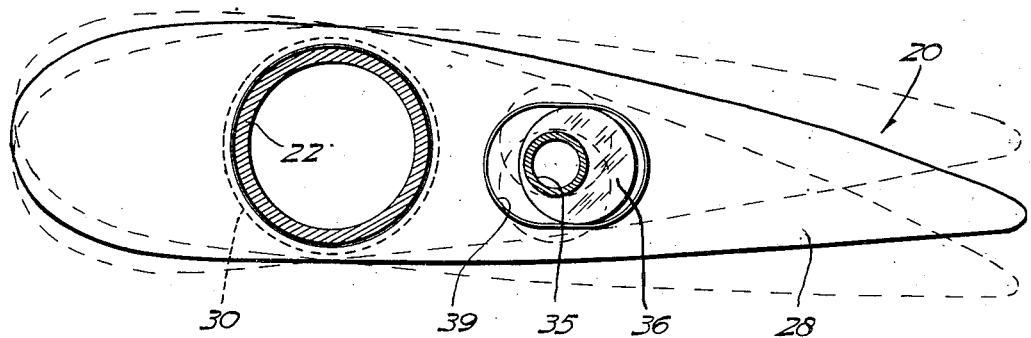
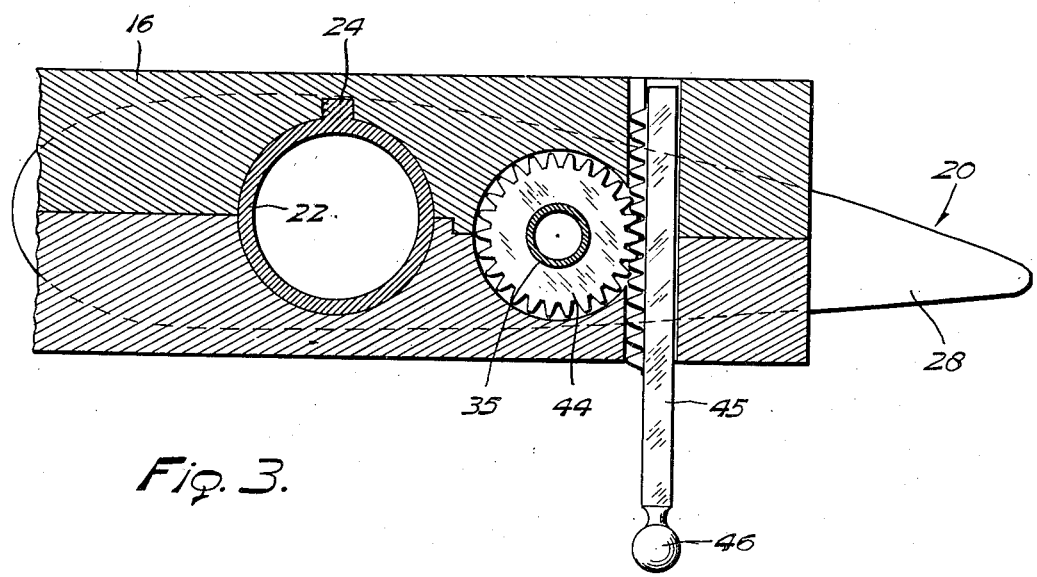
Fig. 3.
INVENTOR.
Alvern E. Koeppe
BY
Beau, Brooks, Buckley & Beau.
ATTORNEYS

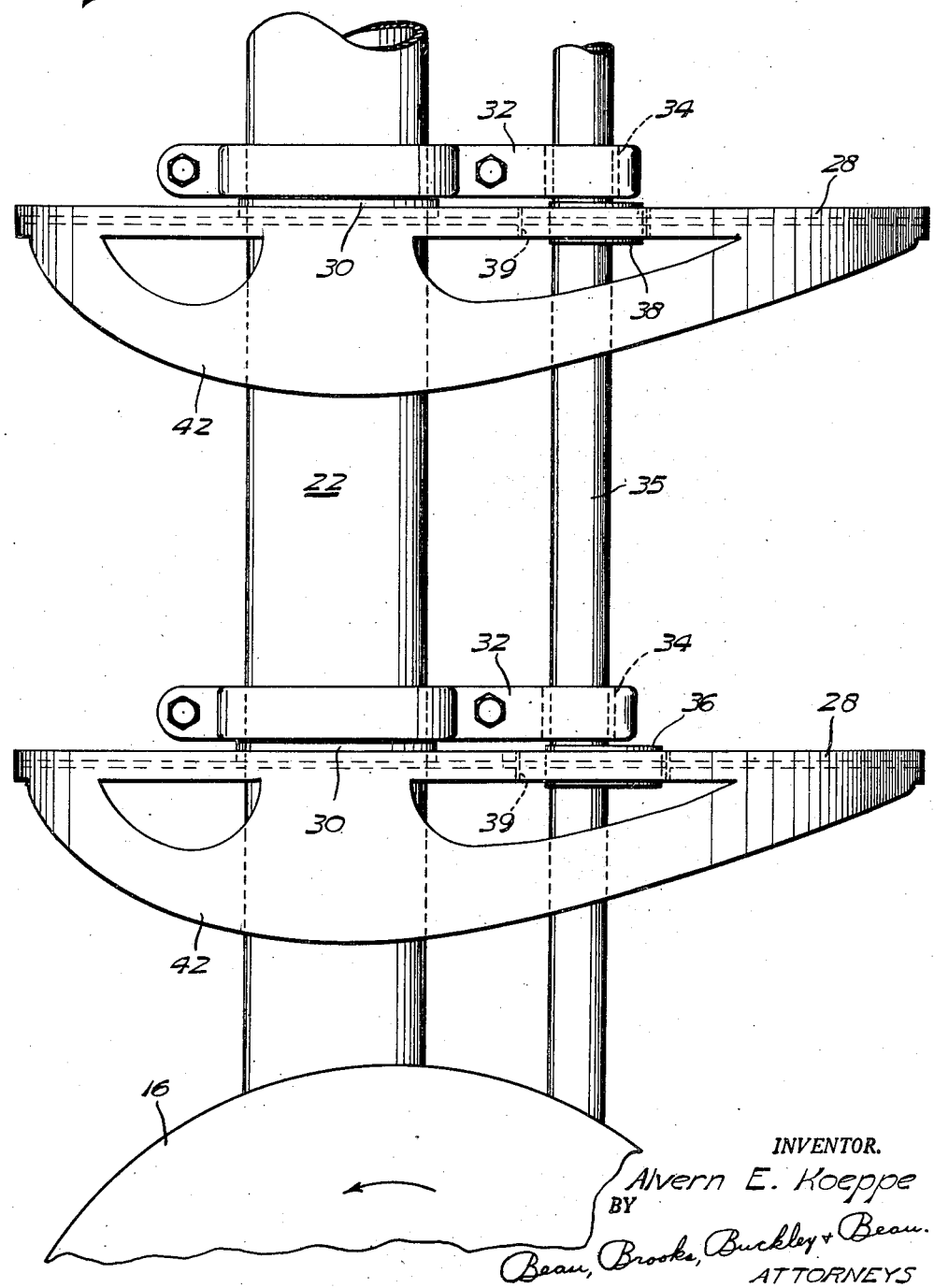

Patented Oct. 11, 1949

2,484,099

UNITED STATES PATENT OFFICE 2,484,099

AIRCRAFT ROTOR AND CONTROL THEREOF

Alvern E. Koeppe, Grand Forks, N. Dak.

Application October 5, 1946, Serial No. 701,434

2 Claims. (Cl. 170—160.24)

This invention relates to airscrews, such as rotary wing aircraft rotors or propellers; and more particularly to an improved rotor structure and control means therefor, for use for example in helicopters and the like.

One of the objects of the present invention is to provide particularly for use in rotary wing aircraft a rotor mechanism of improved form whereby to obtain overall smoother operation. Another object of the invention is to provide an improved airscrew for aircraft whereby to obtain improved efficiency and maximum thrust developments in return for a given power input. Another object of the invention is to provide an improved airscrew particularly for use in rotary wing aircraft whereby lift effects are uniformly distributed throughout the blade length; as a result of which an improved overall disc loading is obtained in combination with elimination of operational roughness characteristics such as are usually inherent in large rotors. Another object of the invention is to provide in rotary wing aircraft an improved rotor device so constructed and arranged as to avoid progressive stalling from tip to hub, and the usually attendant vibration effects. Another object of the invention is to provide in rotary wing aircraft an improved rotor device which avoids unequal loading of the blade at different stations spanwise of the blade. Another object of the invention is to provide an improved rotor whereby to minimize profile and dynamic drag effects throughout the blade span under all operating conditions. Other objects and advantages of the invention will be apparent from the following specification.

It is believed that some attempts have been previously made to variably adjust different spanwise sections of the rotor blade to different angles of attack in accord with changing conditions of operation so as to equalize the loadings at different stations spanwise of the blade. Such prior attempts have been made by use of angularly adjustable flaps carried at the rotor blade trailing edges; but such attempts have not been fully effective and do not fulfill the purpose of the present invention because such prior art arrangements embody discontinuously profiled airfoil sections whereby angularly changing airstream paths about the blade section are established, optimum aerodynamic efficiencies are precluded, and vibration and lowered efficiency is inevitable.

The invention contemplates provision in a rotor of means for twisting the blade or blades thereof so as to progressively alter the angles of attack of the blades at different stations therealong, and to regulate the degrees of twist at the different stations so as to procure under all operating conditions equal aerodynamic loadings against all portions of blades in combination with maximum aerodynamic efficiencies at all stations spanwise of the blades. The invention may be practiced in connection with rotor arrangements wherein the blade roots are either fixed into a central hub, or in connection with a rotor arrangement wherein the blades are arranged to be individually articulated relative to a central hub. In the interests of simplicity of the drawing, however, the invention is illustrated and described herein in connection with a rotor comprising a hub pivoted to the helicopter mast and having a pair of blades fixed to the hub and extending diametrically therefrom.

In the drawing:

Fig. 3 is a section, on an enlarged scale, as along line III—III of Fig. 2;

Fig. 4 is a section, on an enlarged scale, along line IV—IV of Fig. 2; and

Fig. 5 is an enlarged fragmentary plan view of a portion of the rotor blade frame structure.

Figure 1:
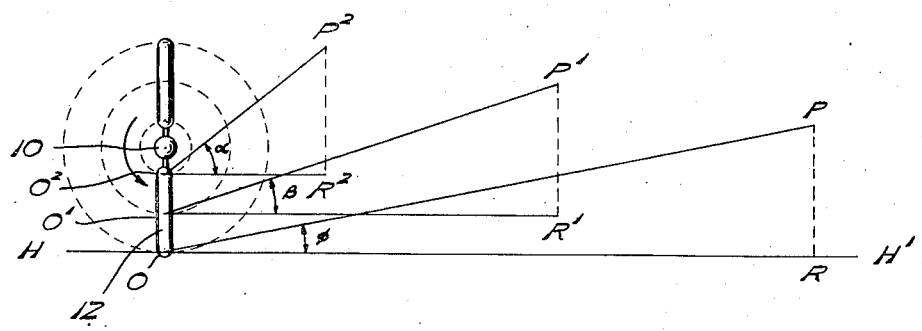
Fig. 1 is a diagram illustrating graphically the different lineal velocities at different spanwise stations of the blade and the corresponding angles of adjustment of the angle of attack at such stations as are required to provide equal loadings on the blade at all spanwise stations thereof.

Fig. 1 graphically illustrates the relationship of angular velocity vs. lineal velocity or pitch of different portions of a rotor blade; the three portions of the blade selected for the purposes of the example herein being at the tip end and at the root end and at a midway position therebetween. The rotor hub is designated 10, and the blade 12; and the distance travelled by the tip end portion of the blade during one revolution of the rotor is graphically illustrated by the line OP. The distance simultaneously travelled by the midway portion of the blade is illustrated by $O'P'$; and the distance travelled by the root end portion of the blade is illustrated by the line $O^2P^2$. The lines OP, $O'P'$, and $O^2P^2$ are plotted by first laying out lines OR, $O'R'$ and $O^2R^2$ so as to correspond in length to the circumferences, respectively, of the plan view paths of the points O, $O'$, $O^2$. The lines RP, $R'P'$ and $R^2P^2$ are plotted to equal the pitch setting of the blade, and are equal. Therefore, the angles included between these plotted lines vary as graphically illustrated by $\phi$, B and $\alpha$; and the graphical illustration of these angles in Fig. 1 indicates the different degrees of twist that should be imposed in the rotor blade at the corresponding stations in order to give the blade throughout its spanwise extent uniform aerodynamic loadings and to provide smooth and vibration-free rotor operations.

Figs. 2–5 illustrate more specifically one physical form in which the invention may be expressed, and it is to be understood that the invention may be applied with equal facility to many other types of rotor constructions, and that the example illustrated herein is not to be construed to be limiting in any respect. The construction illustrated in Figs. 2–5 includes a tubular drive shaft 15 which may comprise the rotor mast in a rotary wing type aircraft, and a rotor hub 16 which is connected to one end of the shaft 15 by means of aligned trunnion bearings 18—18 so that the rotor hub is free to pivot relative to the mast about an axis transverse to the longitudinal axis of the mast.

Figure 2:
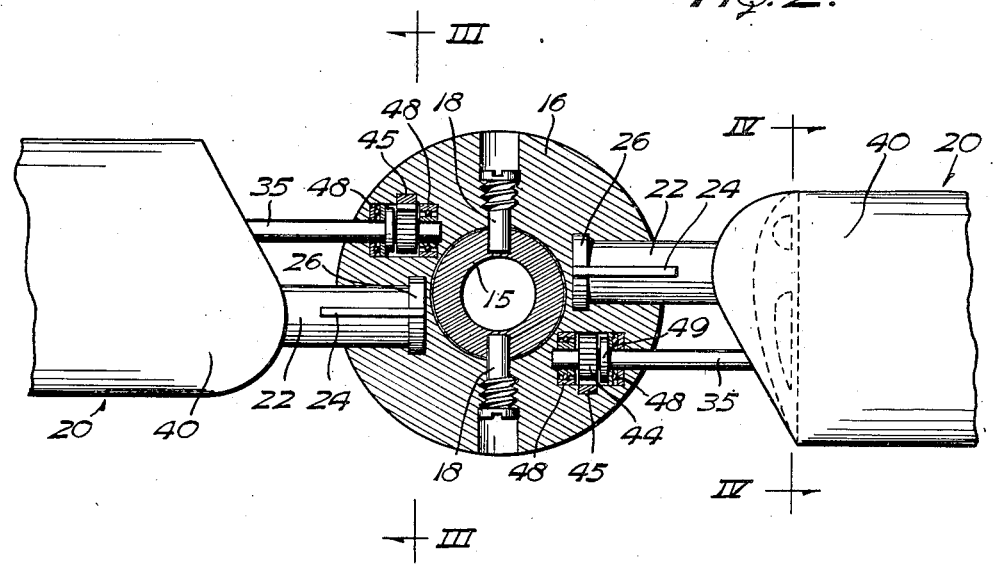
Fig. 2 is a fragmentary top plan, with portions shown in section, of a rotor hub and blade mechanism of the invention.

In Fig. 2 the rotor is illustrated to include a pair of blades which are indicated generally at 20—20 and include spar members 22 anchored in the hub 16. As explained hereinabove, the present drawing illustrates application of the invention to a rotor construction wherein the blade spars extend in cantilever fashion from the blade hub; and to this end the spars 22 are illustrated to be keyed as at 24 into the hub. Also, to resist centrifugal loads the spars are illustrated to include end thrust collars 26—26. As illustrated in Fig. 3 the hub 16 may be of two-part form; the two halves being formed to clamp upon the spar root ends and to be locked together thereon by means of bolts or the like (not shown) whereby the unit may be finally assembled into firmly locked condition.

The spars 22 will be preferably torsionally rigid throughout their lengths, and the rotor blades to be carried thereby are illustrated in Figs. 4–5 to include pluralities of ribs 28 which are arranged in parallel spaced relation spanwise of the spars and rotatably mounted thereon as by means of bearing devices as indicated at 30. Thus, the ribs 28 are selectively rotatable upon their mounting spars, unless otherwise restrained, and in order to control the angular adjustments of the ribs 28 I contemplate any suitable displacement type control means connected to each of the ribs for selectively adjusting the latter with respect to their angular positions about the axis of the mounting spar. For example, as illustrated in the drawings herein the rib control means may comprise a plurality of brackets 32 which are rigidly clamped upon the spar 22 so as to extend radially therefrom in rigid cantilever fashion adjacent the positions of the ribs 28; each of the brackets 32 terminating in a bearing portion 34 (Fig. 5) to rotatably accommodate a cam shaft 35.

The cam shaft 35 is spanwise coextensive with the rotor blade 20; and mounts in keyed relation thereon a plurality of cams such as are illustrated at 36—38 (Figs. 4–5); one of said cams being disposed in each instance within a slot shaped opening in one of the rib members 28, as indicated at 39 in Fig. 5. The long axes of the slotted openings are disposed horizontally as viewed in Fig. 4, whereby it will be understood that rotation of the cam shaft 35 will cause the trailing ends of the ribs 28 to individually oscillate vertically upon the spar 22. Furthermore, the invention contemplates that the cams carried by the cam shaft will be of progressively greater eccentricities and/or sizes, ranging from the tip ends of the blades toward the hub. The cams will be preselected so as to procure the desired degree of twist at corresponding stations along the rotor blade; and thus it will be understood that controlled rotation of the cam shafts 35 will accordingly twist or warp the blade in such manner as to provide for maximum efficiency under all conditions of blade adjustment.

The ribs 28 are profiled as illustrated in Figs. 3–4 in accord with any desired airfoil section selection, and a covering of any suitable material to span the spaces between the ribs and to carry out the profile contour thereof will be employed to envelop the spar-rib structure, as illustrated at 40 (Fig. 2). As illustrated in Fig. 5, the ribs 28 may be formed to include top and bottom flange portions of laterally flaring contour as indicated at 42 for bracing the rib web sections and the covering material against lateral bending under operative loads.

To control the setting of the cam shaft 35, the invention contemplates any suitable pilot-operable control mechanism such as may include, merely for purposes of example herein, a pinion 44 keyed to each cam shaft and arranged to be driven by a gear rack 45 (Fig. 3) which is shown to be vertically slidable relative to the hub structure 16 and guided thereby to remain in mesh with the pinion 44. At their lower ends the bars 45 may be arranged as indicated at 46 for connection to any suitable pilot-operable control mechanism, as through a wobble plate device or the like; whereby it will be understood that the rack bars 45 may be selectively displaced by the pilot relative to the hub structure either simultaneously and equally for feathering adjustments of the rotor blades, or selectively and unequally for cyclically unequal adjustments thereof such as are useful in maneuvering control of the aircraft.

As illustrated in Fig. 2, the cam shafts 35—35 are shown to be carried upon frictionless bearings 48, and may include thrust collars 49 if desired. It is to be understood that although the drawing illustrates the cam shafts 35 to be disposed parallel to the spar tubes 22, the cam shafts may in lieu thereof be arranged non-parallel to the spars 22 so that equal sized cams would be adapted to function to provide the same type of twist adjustments referred to hereinabove. Also, it will be understood that in lieu of the rotary cam and bearing arrangements illustrated at 36—39, the shafts 35 may be formed with radially extending horns of varying lengths which in turn are connected through suitable link devices to the corresponding rib members for variably rotating the ribs relative to the spars for the twist adjustment purposes set forth hereinabove.

It will also be understood that although only one form of the invention has been shown and described in detail, it will be apparent to those skilled in the art that the invention is not so limited but that various changes may be made therein without departing from the spirit of the invention or the scope of the appended claims.

I claim:

1. An airscrew blade comprising, a pair of substantially torsionally rigid spars extending lengthwise of said blade and in generally parallel relation; a plurality of blade ribs journalled upon a first one of said spars at intervals therealong and separately rotatable thereon, covering means carried by said ribs to provide the aerodynamic contour of said blade, and cam means carried by the second one of said spars at positions thereon in registry with said ribs and operable upon rotation of said second spar to separately rotate said ribs about said first spar to different degrees for twisting the aerodynamic shape of said blade.

2. A rotary wing aircraft blade comprising a hub, a substantially torsionally rigid spar extending from said hub lengthwise of said blade, a torque shaft journalled upon said hub and extending generally parallel to said spar, a plurality of blade ribs journalled upon said spar at intervals therealong and separately rotatable thereon, covering means carried by said ribs to provide the aerodynamic contour of said blade, and cam means carried by said torque shaft at positions thereon in registry with said ribs and operable upon rotation of said shaft to rotate said ribs about said spar to different degrees for twisting the aerodynamic shape of said blade, and means operable to rotate said shaft.

ALVERN E. KOEPPE.

REFERENCES CITED

The following references are of record in the file of this patent:

UNITED STATES PATENTS

| Number | Name | Date |
| --- | --- | --- |
| 1,145,013 | Gallaudet | July 6, 1915 |
| 1,526,230 | Pescara | Feb. 10, 1925 |
| 1,611,717 | Bushyager | Dec. 21, 1926 |
| 1,963,531 | Roberts | June 19, 1934 |

FOREIGN PATENTS

| Number | Country | Date |
| --- | --- | --- |
| 272,578 | Great Britain | June 9, 1927 |
| 532,399 | France | Feb. 2, 1922 |